Figure 1:
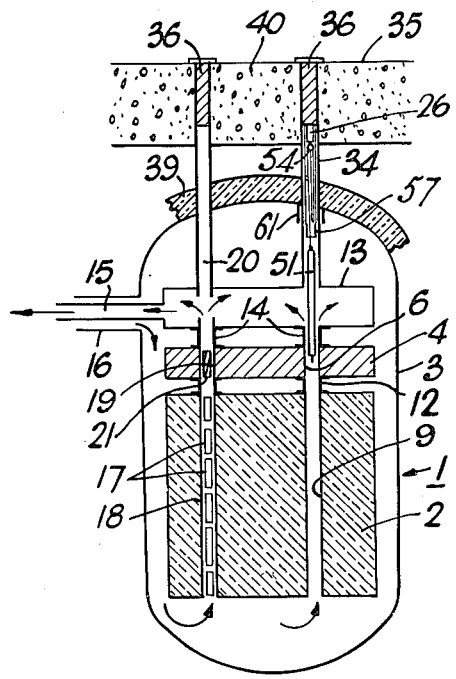

March 8, 1966 R. H. CAMPBELL 3,239,422
GAS COOLED NUCLEAR REACTOR WITH IMPROVED SHIELD
AND CONTROL ROD ARRANGEMENT
Filed March 6, 1961 2 Sheets-Sheet 1

INVENTOR
Ronald Hugh Campbell
BY
Lawson and Taylor

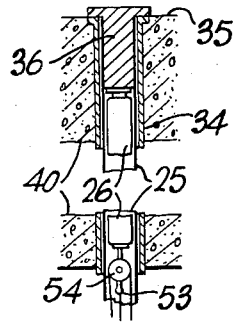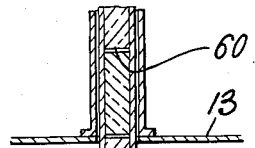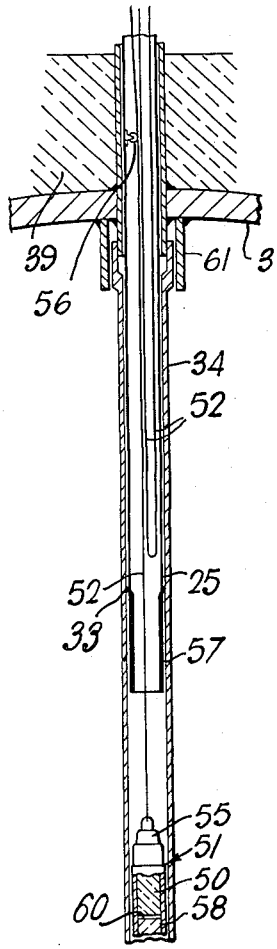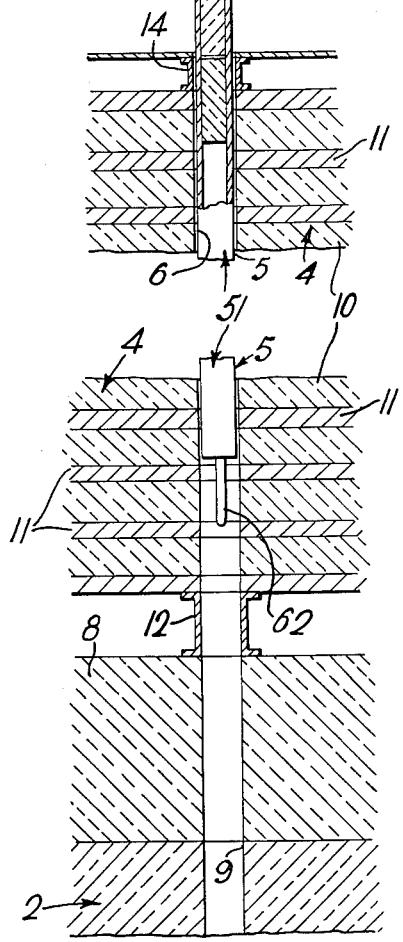
FIG.2A. FIG.2B.

United States Patent Office 3,239,422
Patented Mar. 8, 1966

3,239,422
GAS COOLED NUCLEAR REACTOR WITH IMPROVED SHIELD AND CONTROL ROD ARRANGEMENT
Ronald Hugh Campbell, Hale, England, assignor to United Kingdom Atomic Energy Authority, London, England
Filed Mar. 6, 1961, Ser. No. 93,787
1 Claim. (Cl. 176—33)

This invention relates to neutron shields for nuclear reactors. In fluid cooled, solid moderated (for example, graphite) nuclear reactors, high operating temperatures and high neutron fluxes may distort the moderator structure to such an extent as to necessitate repair or replacement. To enable this to be done, access regions of the pressure vessel containing the moderator structure are protected from activation and damage by neutrons escaping from the moderator by the provision of neutron shielding inside the pressure vessel and in close proximity with the moderator structure, such that the reactor control rods, when withdrawn, pass into access passages through the neutron shielding.

The neutron shielding is further pierced by passages allowing access to the fuel element channels of the moderator structure, and here a problem arises in that neutrons escaping from the moderator can stream through both the fuel element and control rod access passages to cause local activation and damage to the pressure vessel. Neutron streaming through the fuel element access passages can be prevented by the provision of a scatter shielding device in each passage, the shielding device having a plurality of surfaces so as to scatter neutrons and thereby cause them to be absorbed in the neutron shielding whilst permitting a flow of fluid coolant through the passage without substantial pressure drop across the neutron shielding. These shielding devices are removable to allow refuelling of the reactor.

The control rod access passages, however, have to be unrestricted to allow free withdrawal of the control rods from the core and into the shield and it therefore becomes an object of the invention to provide this facility, whilst protecting from neutron activation and damage, regions of the pressure vessel aligned with the control rod access passages.

The present invention relates to a nuclear reactor having a moderator structure, a pressure vessel enclosing the moderator structure, neutron shielding between the pressure vessel and the moderator structure and in close proximity with the moderator structure, control rods for the reactor and access passages for the control rods piercing the neutron shielding and comprises the provision of further neutron shielding incorporated in the control rods and disposed in the ends thereof remote from the moderator structure.

An embodiment of the invention will now be described by way of example with reference to the accompanying drawings wherein:

FIGURE 1 is a diagrammatic side view and
FIGURES 2A and 2B combine to form an enlarged detail of FIGURE 1.

Referring to the figures, a nuclear reactor 1 has a graphite moderator structure 2 contained in a pressure vessel 3, neutron shielding 4 inside the vessel 3 in close proximity with the moderator 2, control rods 51 (only one which is shown) for the reactor, vertically orientated control rod access passages 6 piercing the shielding 4 and further neutron shielding 50 incorporated in the upper ends of the control rods 51.

The moderator structure 2 has an upper neutron-reflecting portion 8 (FIG. 2B) and the moderator is pierced by control rod channels 9. The neutron shielding 4 is formed of alternate layers of graphite blocks 10 and boron steel plates 11. The shielding 4 is supported by and spaced from the moderator structure 2 by tubular supports 12 which also connect the channels 9 with the passages 6. Similarly, a coolant header 13 is supported by and spaced from the shielding by tubular supports 14 which also connect the passages 6 with the header 13. Coolant enters the vessel 3 (FIGURE 1) by way of an outer co-axial duct 16 and flows upwardly through the moderator 2 to collect in the header 13 whence it leaves the vessel 3 by way of an inner co-axial duct 15. The prime purpose of the coolant is to remove heat from nuclear fuel elements 17 in fuel element channels 18 but the control rods 51 are cooled also. Access is gained to the fuel element channels 18 by access passages 19 in the shielding 4 and access tubes 20 piercing the vessel 3. Neutron scatter plugs 21 allow passage of coolant whilst preventing neutron streaming through the passages 19.

Outer guide tubes 34 extend from the reactor charge face 35 through the vessel 3 to the header 13. The upper end of the uppermost guide tube 34 is sealed by a plug 36 which also carries an electric motor 26. The pressure vessel 3 is insulated by lagging 39 and is contained within a concrete biological shield 40.

Each control rod 51 is suspended from the electric motor 26 by a chain 52 and is raised or lowered thereby for reactor control. The chain 52 passes down in a loop from an anchor point 53 adjacent a sprocket wheel 54 driven by the motor 26 to pass over the sprocket wheel 54 and from thence to the head 55 of the control rod 51 by way of a guide sprocket 56. The motor 26 is disposed in a tubular extension 25 of mild steel attached to the underside of the plug 36. The lower end of the extension 25 constitutes an annular member formed by a thickened portion 57 of the extension 25 having generally an external diameter greater than the external diameter of the control rod 51 and at 33 a portion which contacts the guide tube 34. Each control rod 51 consists of a boron-steel tube 58, the upper two-thirds of which houses shielding 50 in the form of graphite plugs 59 end-spaced by boron-steel plates 60. For emergency shut-down of the reactor, the control rods 51 can be released to fall by gravity into the moderator 2 by de-energising the motor 26. An energy-absorbing device 62 is provided at the lower end of each control rod 51.

The majority of neutrons streaming up from the channel 9 in the moderator structure 2 are first slowed to thermal speeds by the graphite plugs 59 and then captured in the boron-steel plates 60. The remainder continue along the annuli between the control rods 51 and guide tubes 34 to be scattered by the thickened ends 57 of the extensions 25a. Stray neutrons in the vicinity of the upper ends of the guide tubes 34 are absorbed by boron-steel sleeves 61 attached to the inner walls of the pressure vessel 3 and enclosing the guide tubes 34.

I claim:

A gas-cooled nuclear reactor having a moderator structure, a pressure vessel enclosing the moderator structure, a neutron shield structure between the pressure vessel and the moderator structure and in close proximity with said moderator structure, said neutron shield structure defining passages allowing access to said moderator structure, reactor control rods of hollow form located lengthwise of said passages and movable axially therein towards and away from the moderator structure, control rod moving means disposed on the side of the neutron shield structure remote from the moderator structure, neutron shielding incorporated in each control rod and disposed in the end thereof remote from the moderator structure at a position at which over the whole range of movement of the control rod it will not enter the moderator structure, said neutron shielding comprising plugs of graphite for neutron moderating end-spaced by plates of boron steel for neutron absorbing, guide tubes disposed lengthwise between the neutron shield structure and the inner surface of the pressure vessel, an annular member disposed in each guide tube at a position between the neutron shield structure and the inner surface of the pressure vessel for scattering neutrons which may stream between the respective control rod and guide tube, and a sleeve of boron steel carried by the inner surface of the pressure vessel and embracing the upper end of each guide tube for capturing neutrons which may have penetrated thus far.

References Cited by the Examiner

UNITED STATES PATENTS

| | | | |
|---|---|---|---|
| 2,861,035 | 11/1958 | Zinn et al. | 176—86 |
| 2,863,815 | 12/1958 | Moore et al. | 176—29 |
| 2,987,488 | 6/1961 | Clark | 252—478 |
| 2,990,360 | 6/1961 | Porembka | 176—86 |
| 2,992,175 | 7/1961 | Borst | 106—97 |
| 3,000,728 | 9/1961 | Long et al. | 176—32 |
| 3,009,867 | 11/1961 | Kinsey | 176—52 |
| 3,086,931 | 4/1963 | Long et al. | 176—33 |
| 3,132,998 | 5/1964 | Long et al. | 176—43 |

FOREIGN PATENTS

| | | |
|---|---|---|
| 1,239,165 | 7/1960 | France. |
| 1,256,186 | 2/1961 | France. |
| 803,708 | 10/1958 | Great Britain. |
| 836,147 | 6/1960 | Great Britain. |

OTHER REFERENCES

Freund et al.: Proceedings of the Second United Nations International Conference on the Peaceful Uses of Atomic Energy, vol. 10, September 1958, page 466.

Rockwell: Reactor Shielding Design Manual, 1956, page 144, first sentence.

Simpson et al.: Proceedings of the International Conference on the Peaceful Uses of Atomic Energy, vol. 3, 1955, pages 211 and 226.

CARL D. QUARFORTH, *Primary Examiner.*